United States Patent
George

(10) Patent No.: US 12,260,099 B2
(45) Date of Patent: Mar. 25, 2025

(54) METHOD, DISTRIBUTED CONTROLLER, AND SYSTEM FOR MANAGING SEQUENTIAL STORAGE DEVICES IN DISTRIBUTED STORAGE ENVIRONMENT

(71) Applicant: SAMSUNG ELECTRONICS CO., LTD., Suwon-si (KR)

(72) Inventor: Arun George, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/158,874

(22) Filed: Jan. 24, 2023

(65) Prior Publication Data
US 2024/0143205 A1   May 2, 2024

(30) Foreign Application Priority Data
Oct. 31, 2022  (IN) .............................. 202241062046

(51) Int. Cl.
G06F 3/06    (2006.01)

(52) U.S. Cl.
CPC .......... G06F 3/0635 (2013.01); G06F 3/0604 (2013.01); G06F 3/067 (2013.01)

(58) Field of Classification Search
CPC ....... G06F 3/0635; G06F 3/0604; G06F 3/067
See application file for complete search history.

(56) References Cited

U.S. PATENT DOCUMENTS

| | | | |
|---|---|---|---|
| 6,775,703 B1 * | 8/2004 | Burns | G06F 12/0866 709/227 |
| 2017/0123721 A1 * | 5/2017 | Sela | G06F 3/0611 |
| 2019/0332316 A1 * | 10/2019 | Kanno | G06F 3/0659 |
| 2020/0241798 A1 * | 7/2020 | Kanno | G06F 3/064 |
| 2021/0149591 A1 * | 5/2021 | De Roeck | G06F 3/0619 |
| 2021/0223994 A1 * | 7/2021 | Kanno | G06F 3/0644 |
| 2022/0147283 A1 * | 5/2022 | Kanno | G06F 3/0659 |
| 2022/0413737 A1 * | 12/2022 | Veluswamy | G06F 3/0679 |
| 2023/0065300 A1 * | 3/2023 | Labat | G06F 3/0604 |
| 2023/0305754 A1 * | 9/2023 | Kanno | G06F 3/0656 |

OTHER PUBLICATIONS

Datacore, SAN Performance Improvement, Sep. 2021, available at: https://www.datacore.com/solutions/san-performance-solutions/ & https://www.datacore.com/products/sansymphony/random-write-accelerator/ (Year: 2021).*

* cited by examiner

*Primary Examiner* — Ryan Bertram
(74) *Attorney, Agent, or Firm* — Sughrue Mion, PLLC

(57) ABSTRACT

A method of managing sequential storage devices in a distributed storage environment including receiving, by a distributed controller, requests for performing operations, from one or more client devices in a distributed storage environment, each request including data of a client device from the one or more client devices and an identifier of a host device from one or more host devices, each of the one or more host devices being associated with one or more sequential storage devices, determining, by the distributed controller, a sequential order of the requests, based on the identifiers included in the requests, and performing, by the distributed controller in the sequential order, the operations on the one or more sequential storage devices.

16 Claims, 7 Drawing Sheets

METHOD, DISTRIBUTED CONTROLLER, AND SYSTEM FOR MANAGING SEQUENTIAL STORAGE DEVICES IN DISTRIBUTED STORAGE ENVIRONMENT

CROSS-REFERENCE TO RELATED APPLICATIONS

This application is based on and claims priority to Indian Patent Application No. 202241062046, filed on Oct. 31, 2022 in the Indian Patent Office, the contents of which being herein incorporated by reference in its entirety.

BACKGROUND

The present disclosure generally relates to storage devices. More particularly, the present disclosure relates to a method, a distributed controller, and a system for managing sequential storage devices in a distributed storage environment.

An exponential growth of data volumes in industries demands a distributed storage system. The distributed storage system is an infrastructure that splits data across multiple physical servers. With advancement in technology, sequential storage devices are deployed to achieve higher storage capacities, increased throughput, lower latencies, and the like. The sequential storage devices are storage devices in which the data of the client devices can only be written sequentially. The sequential storage devices needs to be managed to efficiently store the data of the client devices.

SUMMARY

According to an aspect of one or more embodiments, there is provided a method comprising receiving, by a distributed controller, a plurality of requests for performing a plurality of operations, from one or more client devices in a distributed storage environment, each request comprising data of a client device from the one or more client devices and an identifier of a host device from one or more host devices, each of the one or more host devices being associated with one or more sequential storage devices; determining, by the distributed controller, a sequential order of the plurality of requests, based on the identifiers included in the plurality of requests; and performing, by the distributed controller in the sequential order, the plurality of operations on the one or more sequential storage devices.

According to another aspect of one or more embodiments, there is provided a distributed controller comprising a memory, a communication interface for communicating between one or more host devices and one or more client devices of a distributed storage environment, and one or more processors coupled to the memory. The memory stores processor-executable instructions, which, on execution, cause the one or more processors to at least receive a plurality of requests for performing a plurality of operations, from the one or more client devices, each request comprising data of a client device from the one or more client devices and an identifier of a host device from the one or more host devices, each of the one or more host devices being associated with one or more sequential storage devices; determine a sequential order of the plurality of requests, based on the identifiers included in the plurality of requests; and perform, in the sequential order, the plurality of operations on the one or more sequential storage devices.

According to yet another aspect of one or more embodiments, there is provided a system comprising, in a distributed storage environment, one or more client devices; one or more host devices, each host device comprising and being associated with one or more sequential storage devices; and a distributed controller configured to at least receive a plurality of requests for performing a plurality of operations, from the one or more client devices, each request comprising data of a client device from the one or more client devices and an identifier of a host device from the one or more host devices; determine a sequential order of the plurality of requests, based on the identifiers included in the plurality of requests; and perform, in the sequential order, the plurality of operations on the one or more sequential storage devices.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
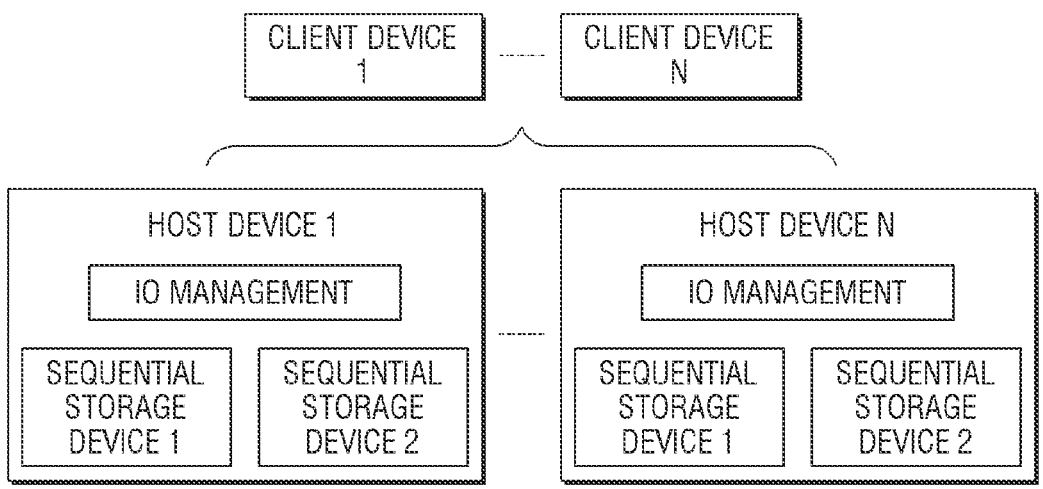
FIG. 1 illustrates a storage architecture, according to the related art.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, various specific embodiments thereof have been shown by way of example in the drawings and will be described in detail below. It should be understood, however, that the various specific embodiments are not intended to limit the disclosure to the particular forms disclosed, but on the contrary, the disclosure is to cover all modifications, equivalents, and alternatives falling within the scope of the appended claims.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

As discussed above, a distributed storage system is an infrastructure that splits data across multiple physical servers. The distributed storage system includes multiple servers or host devices that form a cluster, with a mechanism for data synchronization and coordination between the host devices. Each host device includes multiple storage devices for storing the data of client devices. Sequential storage devices may be deployed to achieve higher storage capacities, increased throughput, lower latencies, and the like. The sequential storage devices are storage devices in which the data of the client devices can only be written sequentially. For example, the sequential storage devices may include zoned storage devices, host managed storage devices, and the like. Each host device includes multiple sequential storage devices for storing the data of the client devices. The sequential storage devices needs to be managed to efficiently store the data of the client devices.

FIG. 1 illustrates a storage architecture, according to the related art. For example, the storage architecture may be a storage cluster architecture which includes client devices (client device 1 to client device N) and host devices (host device 1 to host device N). Each host device is associated with multiple sequential storage devices. For example, the host device 1 is associated with sequential storage device 1 and sequential storage device 2). Each host device manages the respective sequential storage devices. Such architectures include, for example, a Ceph architecture, a B-Tree Filesystem (BTRFS), and the like. The host devices manage resources such as, Central Processing Unit (CPU), memory, and the like, to handle respective sequential storage devices. Input Output (TO) management of the sequential storage devices such as device offset handling, buffer handling, block allocation, and the like, is managed by the respective host device. However, since the host devices individually manage the respective sequential storage devices, each host device processes random IO requests from the client devices to write the data sequentially in the sequential storage devices. This operation is not an efficient way of managing the storage cluster in terms of overall performance and network bandwidth utilization. Thus, the related art architecture includes multiple host devices, each host device comprising multiple sequential storage devices. The host devices individually manages the respective sequential storage device. That is, Input Output (TO) management of the sequential storage devices is performed by the respective host device. This operation reduces device performance and minimizes utilization of network bandwidth.

The present disclosure provides a method, a distributed controller, and a system for managing the sequential storage devices in a distributed storage environment. The IO management of the sequential storage devices is performed by the distributed controller communicating between the client devices and the host devices. The distributed controller converts random IO requests from the client devices in a sequential order for storing the data of the client devices in the sequential storage devices. This configuration helps to maximize performance. Further, operations on the sequential storage devices are faster since the operations are performed in parallel across the host devices. A dedicated IO path is provided between the host devices and the client devices via the distributed controller. Hence, an IO path which is used for data communication between the host devices and the client devices is not impacted. The dedicated IO path avoids idle times, thus increasing system throughput and optimizing network bandwidth utilization. Data may be cached in the distributed controller instead of writing to the sequential storage devices. The data may be then written to the sequential storage devices, based on a requirement identified by the one or more client devices or the distributed controller.

Figure 2:
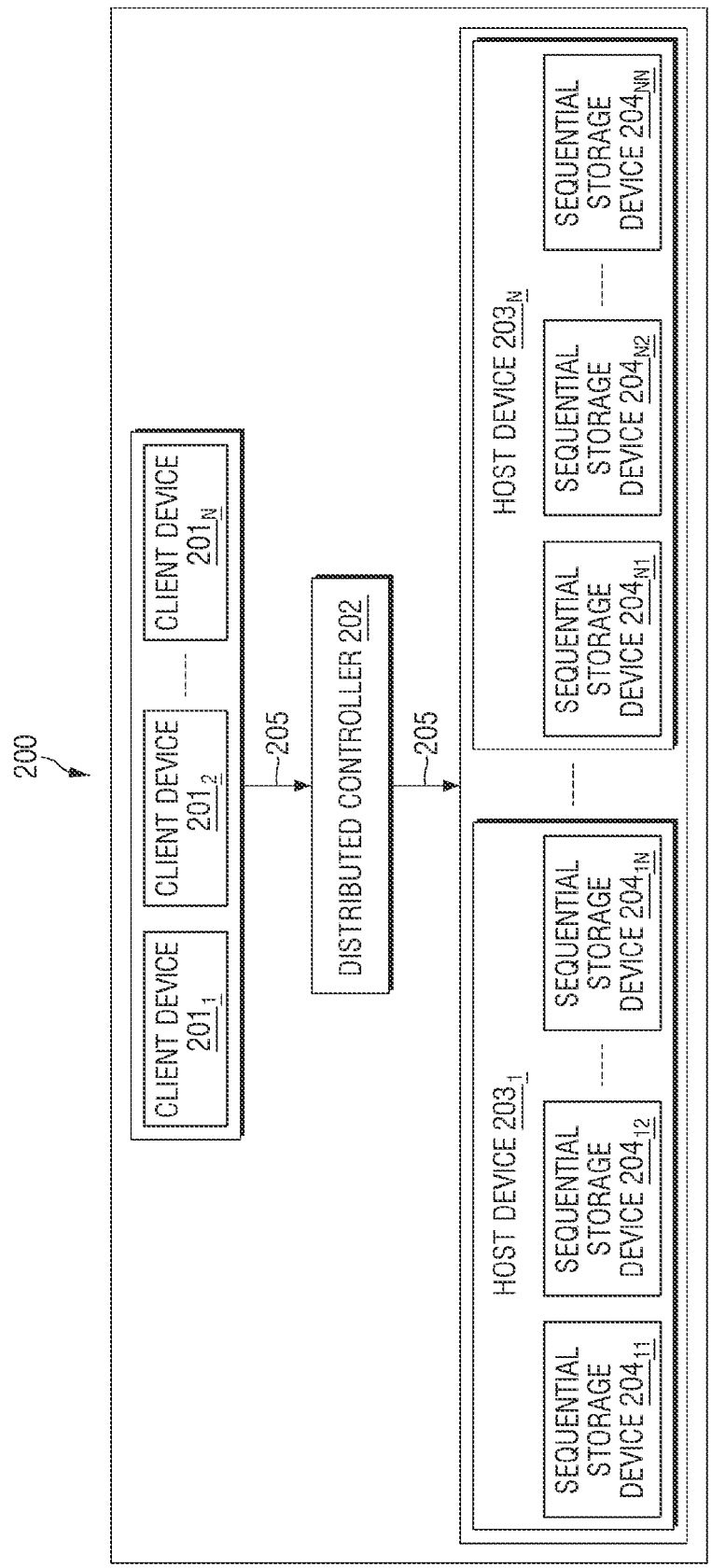
FIG. 2 illustrates an exemplary system for managing the sequential storage devices in the distributed storage environment, in accordance with some embodiments.

FIG. 2 illustrates an exemplary system 200 for managing the sequential storage devices in the distributed storage environment, according to some embodiments. The system 200 comprises one or more client devices $201_1$, $201_2$, . . . , $201_N$ (collectively referred as the one or more client devices 201), a distributed controller 202, and one or more host devices $203_1$, $203_2$, . . . , $203_N$ (collectively referred as the one or more host devices 203). Each of the one or more client devices 201 is a computing device associated with a client and in which different applications of the client are executed. Each of the one or more host devices 203 is a computing device or a server that communicates with the one or more client devices 201 for storing data of the one or more client devices 201. Each of the one or more host devices 203 comprises one or more sequential storage devices. For instance, the host device $203_1$ comprises the one or more sequential storage devices $204_{11}$, $204_{12}$, . . . , $204_{1N}$, the host device $203_N$ comprises the one or more sequential storage devices $204_{N1}$, $204_{N2}$, . . . , $204_{NN}$ (collectively referred as the one or more sequential storage devices 204). The one or more sequential storage devices 204 are storage devices in which the data of the one or more client devices 201 can only be written sequentially. The one or more sequential storage devices 204 are deployed to achieve higher storage capacities, increased throughput, lower latencies, and the like. The one or more sequential storage devices 204 may include zoned storage devices, host managed storage devices, and the like. As an example, consider the one or more sequential storage devices 204 comprises zoned storage devices. The zoned storage devices are in form of zones, with each zone being written sequentially. The data is not overwritten. Instead, the data is compartmentalized and deleted using reset commands. In some embodiments, the zoned storage devices may use Zoned Namespace (ZNS) technology. A person skilled in the art will appreciate that embodiments are not limited thereto and, in some embodiments, the one or more sequential storage devices 204 may include any storage devices other than the above-mentioned sequential storage devices.

It is advantageous to manage the one or more sequential storage devices 204 to efficiently store the data of the one or more client devices 201. According to some embodiments, the distributed controller 202 may manage the one or more sequential storage devices 204. The distributed controller 202 performs IO management of the one or more sequential storage devices 204 via the dedicated IO path 205. The IO management of the one or more sequential storage devices 204 may include device offset handling, buffer handling, block allocation, and the like. The distributed controller 202 communicates between the one or more client devices 201 and the one or more host devices 203, via a communication interface (not shown explicitly in FIG. 2), for performing the IO management. The distributed controller 202 may coordinate IO requests from the one or more client devices 201 among the one or more host devices 203. The distributed controller 202 receives requests from the one or more client devices 201 for performing operations. Each request comprises data of a client device from the one or more client devices 201 and an identifier of a host device from the one or more host devices 203. The requests are cached in the distributed controller 202. The distributed controller 202 determines a sequential order of the requests based on the identifiers included in the cached requests. The operations are performed on the one or more sequential storage devices 204 based on the requests in the sequential order.

Figure 3:
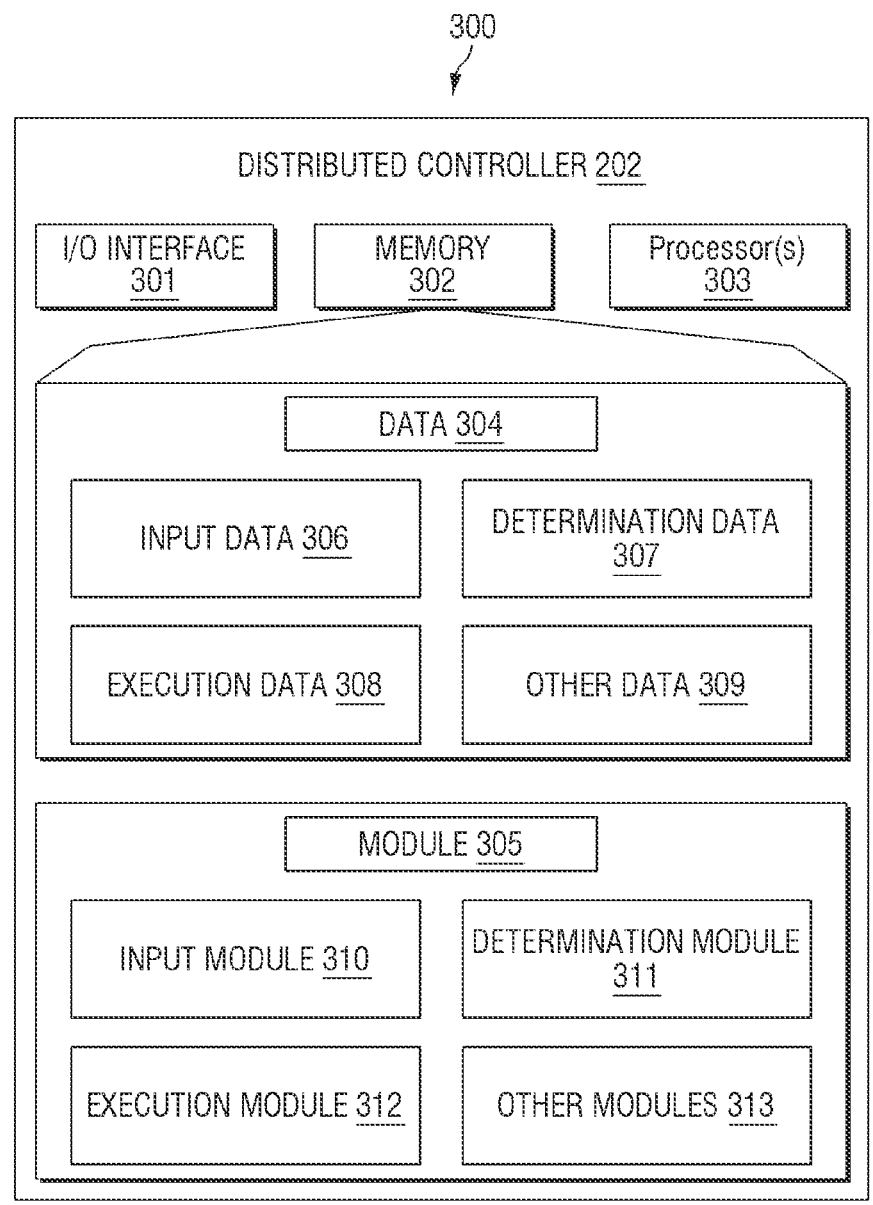
FIG. 3 illustrates a detailed diagram of a distributed controller for managing the sequential storage devices in the distributed storage environment, in accordance with some embodiments.

FIG. 3 illustrates a detailed diagram 300 of the distributed controller 202 for managing the one or more sequential storage devices 204 in the distributed storage environment, in accordance with some embodiments. The distributed controller 202 may include a processor 303, an Input/Output (I/O) interface 301, and a memory 302. The processor 303 may include Central Processing Units (CPUs) and may include one or more processors 303. The processor 303 may also be referred to as "CPUs 303" or "one or more processors 303" below without loss of generality. In some embodiments, the memory 302 may be communicatively coupled to the one or more processors 303. The memory 302 stores instructions executable by the one or more processors 303. The one or more processors 303 may comprise at least one data processor for executing program components for executing user or system-generated requests. The memory 302 may be communicatively coupled to the one or more processors 303. The memory 302 stores instructions, executable by the one or more processors 303, which, on execution, may cause the one or more processors 303 to manage the one or more sequential storage devices 204 in the distributed storage environment. In some embodiments, the memory 302 may include one or more modules 305 and data 304. The one or more modules 305 may be configured to perform various steps using the data 304, to manage the one or more sequential storage devices 204 in the distributed storage environment. In an embodiment, each of the one or more modules 305 may be a hardware circuit which may be outside the memory 302 and coupled with the distributed controller 202. As used herein, the term modules 305 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 305 when configured with the described functionality described further below result in a novel hardware. Further, the I/O interface 301 is coupled with the one or more processors 303 through which an input signal or/and an output signal is communicated. For example, the distributed controller 202 may receive a plurality of requests from the one or more client devices 201 using the I/O interface 301. In an embodiment, the distributed controller 202 may be implemented in a variety of computing systems, such as a laptop computer, a desktop computer, a Personal Computer (PC), a notebook, a smartphone, a tablet, e-book readers, a server, a network server, a cloud-based server, and the like. In some embodiments, the distributed controller 202 may be implemented in one of the one or more host devices 203. In some embodiments, the distributed controller 202 may be implemented in one of the one or more client devices 201. In some embodiments, the distributed controller 202 may be implemented as a separate entity from the one or more client devices 201 and from the one or more host devices 203.

In some implementations, the modules 305 may include, for example, an input module 310, a determination module 311, an execution module 312, and other modules 313. It will be appreciated that such aforementioned modules 305 may be represented as a single module or a combination of different modules. In some implementations, the data 304 may include, for example, input data 306, determination data 307, execution data 308, and other data 309.

In an embodiment, the input module 310 may be configured to receive the plurality of requests from the one or more client devices 201. The plurality of requests may be received for performing a plurality of operations. The plurality of requests received are random IO requests. In some embodiments, the plurality of operations may include write operations. In some embodiments, the plurality of operations may include read cache operations. A person skilled in the art will appreciate that plurality of operations can be any operations other than the above-mentioned operations. Each request of the plurality of requests comprises data of a client device from the one or more client devices 201 and an identifier of a host device from one or more host devices 203.

Figure 4A:
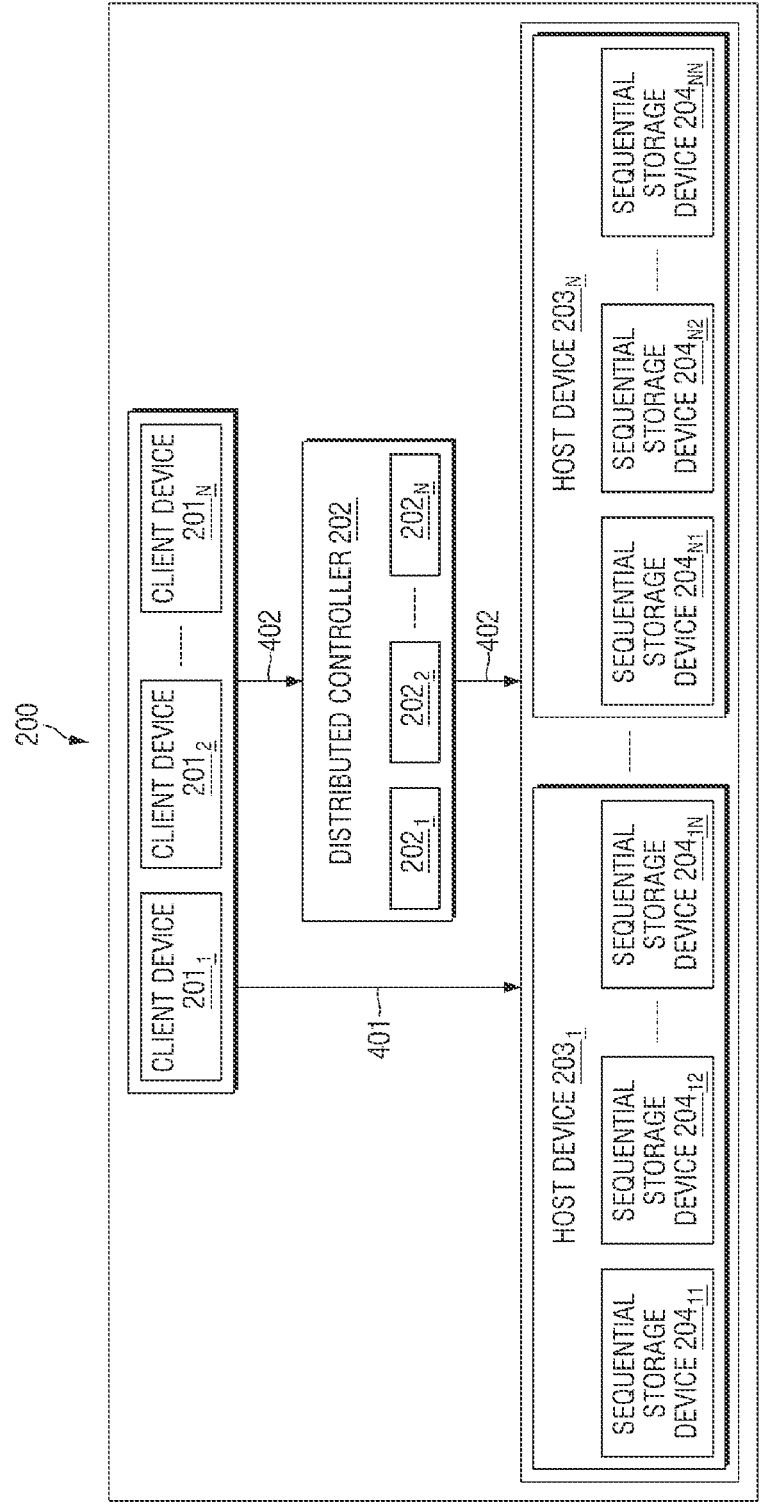
FIG. 4A illustrates an exemplary system comprising controller instances of distributed controller for managing the sequential storage devices in the distributed storage environment, in accordance with some embodiments.
Figure 4B:
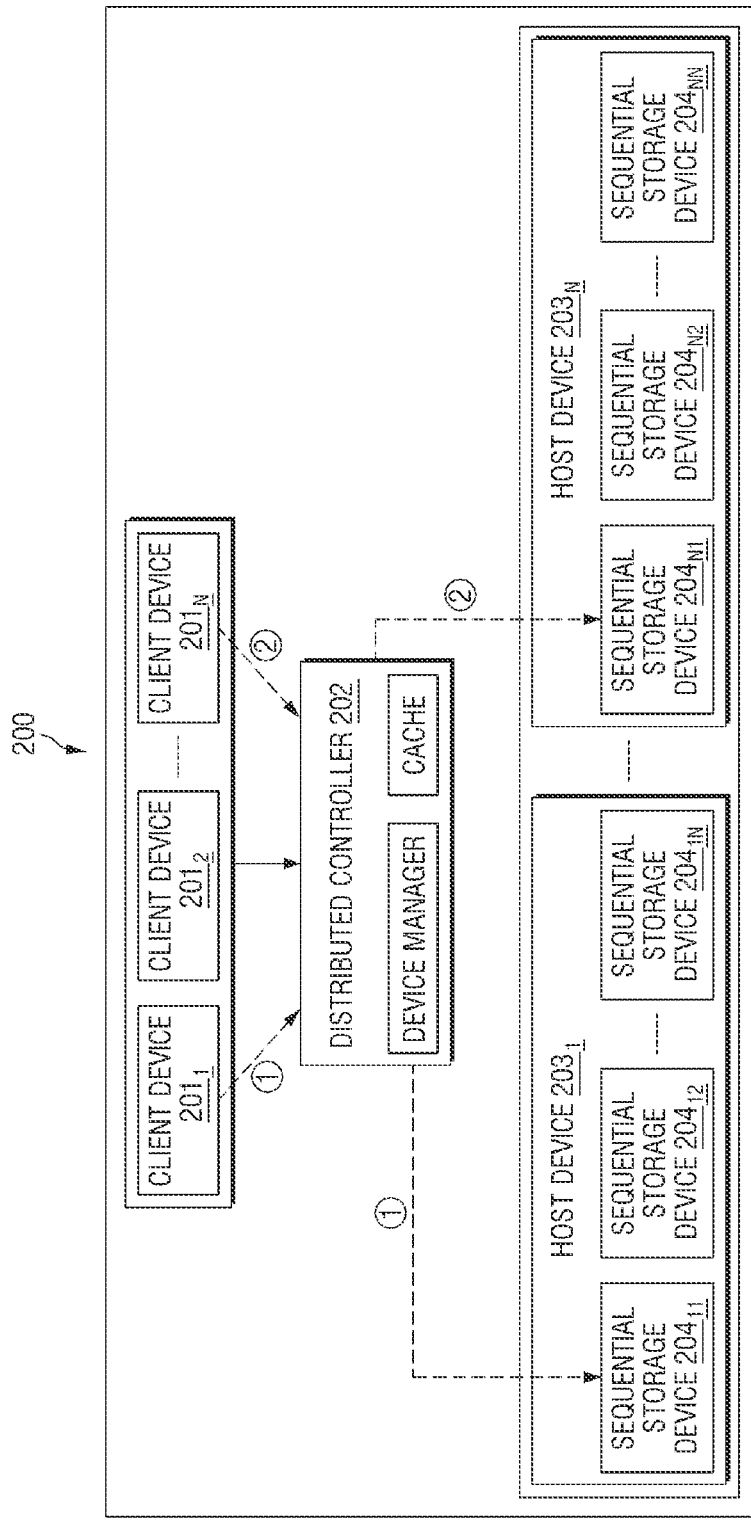
FIG. 4B shows an exemplary illustration for managing the sequential storage devices in the distributed storage environment, in accordance with some embodiments.

FIG. 4A illustrates an exemplary system comprising controller instances of distributed controller for managing the sequential storage devices in the distributed storage environment, in accordance with some embodiments, and FIG. 4B shows an exemplary illustration for managing the sequential storage devices in the distributed storage environment, in accordance with some embodiments.

In some embodiments, the plurality of requests may be received by one or more controller instances $202_1$, $202_2$, ... $202_N$ of the distributed controller 202 as illustrated in FIG. 4A. This configuration and operation provides fault tolerance to the system 200. For example, when a controller instance from the one or more controller instances $202_1$, $202_2$, ... $202_N$ fails, operations of the controller instance may be performed by other controller instances from the one or more controller instances $202_1$, $202_2$, ... $202_N$. The plurality of requests is communicated between the one or more client devices 201 and the one or more host devices 203 via a dedicated IO path 402. Hence, a traditional IO path 401 between the one or more client devices 201 and the one or more host devices 204 is not impacted and data transfer on both the traditional IO path 401 and the dedicated IO path 402 is faster. In some embodiments, the traditional IO path 401 may be provided directed between the one or more client devices 201 and the one or more host devices 204. In some embodiments, data transfer over the traditional IO path 401 may occur in parallel with data transfer over the dedicated IO path 402. This configuration and operations avoids idle times, thus increasing system throughput and optimizing network bandwidth utilization. In some embodiments, the plurality of requests is stored in a cache associated with the distributed controller 202. The distributed controller 202 comprising the cache and a device manager is illustrated in FIG. 4B. In some embodiments, the cache and the device manager may be provided in each of the one or more controller instances $202_1$, $202_2$, ... $202_N$ illustrated in FIG. 4A. A person skilled in the art will appreciate that the distributed controller 202 may comprise components other than the above-mentioned components, and embodiments are not to be considered as limiting. Referring to a first example shown in FIG. 4B, a first request is received from a client device $201_1$ and a second request is received from a client device $201_N$. In a second example not shown in FIG. 4B, requests 1, 2, 3 are received from a client device A for storing data of application A running in the client device A. Requests 4, 5, 6 are received from client device B for storing the data of application B. The requests 1, 2, 3 include an identifier of Host A. The requests 4, 5, 6 include an identifier of Host B. The plurality of requests received from the one or more client devices 201 may be stored as the input data 306 in the memory 302.

In an embodiment, the determination module 311 may be configured to receive the input data 306 from the input module 310. Further, the determination module 311 may be configured to determine a sequential order of the plurality of requests, based on the identifier of each of the one or more host devices 203. The data is written sequentially in the one or more sequential storage devices 204. For example, consider the one or more sequential storage devices 204 as the zoned storage devices. Consider a first zone set A and a second zone set B. The zone storage devices are referred as ZNS devices in the present description. The first zone set A may comprise ZNS device 1, ZNS device 2, and ZNS device 3. The second zone set B may comprise ZNS device 4, ZNS device 5, and ZNS device 6. Data of a first application may be written to ZNS device 1, ZNS device 2, and ZNS device 3 sequentially. Similarly, data of a second application may be written to ZNS device 4, ZNS device 5, and ZNS device 6 sequentially. Hence, the determination module 311 determines the sequential order of the plurality of requests received in a random order from the one or more client devices 201. Referring to the above-mentioned second example, the requests 1, 2, 3, 4, 5, 6 may be received in a random order 1, 3, 6, 2, 4, 5. The determination module 311 may identify that the requests 1, 2, 3 includes the identifier of the host device A. Further, the determination module 311 may identify that the requests 4, 5, 6 includes the identifier of the host device B. The determination module 311 may determine the sequential order as 1, 2, 3, 4, 5, 6. The sequential order of the plurality of requests may be stored as the determination data 307 in the memory 302.

In an embodiment, the execution module 312 may be configured to receive the determination data 307 from the determination module 311. Further, the execution module 312 may be configured to perform the plurality of operations on the one or more sequential storage devices 204 associated with each of the one or more host devices 203, based on the plurality of requests in the sequential order. The plurality of operations may include the write operations for writing the data of the one or more client devices 201 to the one or more sequential storage devices 204. The execution module 312 may receive the sequential order as 1, 2, 3, 4, 5, 6. Referring to the above-mentioned second example, the requests 1, 2, 3 may be from the client device A for writing blocks of data of application A. The requests 4, 5, 6 may be from the client device B for writing blocks of data of application B. In some embodiments, the execution module 312 may write the data to the one or more sequential storage devices 204, upon receiving the sequential order. In some embodiments, the execution module 312 may receive a command to write the data of the one or more client devices 201 to the one or more sequential storage devices 204. The command may be received from users of the one or more client devices 201, and may be a system-generated command from the distributed controller 202, and the like. The execution module 312 may perform the write operations on the one or more sequential storage devices 204 based on the plurality of requests in the sequential order. In an example, when the one or more sequential storage devices 204 include zoned storage devices, the command may be a "Zoned Append". Upon receiving the command, the execution module 312 may write the data to zone sets. Referring to the second example, the data associated with the requests 1, 2, 3 may be written to the first zone set comprising the ZNS device 1, ZNS device 2, and ZNS device 3. The data associated with the requests 4, 5, 6 may be written to the second zone set comprising the ZNS device 4, ZNS device 5, and ZNS device 6. Referring to the first example of FIG. 4B, the data associated with the first request may be stored in the sequential storage device $204_{11}$ and the data associated with the second request may be stored in the sequential storage device $204_{N1}$. In some embodiments, the users of the one or more client devices 201 may choose to cache the data in the distributed controller 202 instead of writing to the one or more sequential storage devices 204. The data may be written to the one or more sequential storage devices 204, based on the requirement. The cache in the distributed controller 202 may operate as a Zone Random Write Area (ZRWA) implemented in each zone set in related art ZNS technology at a distributed controller level, but in a distributed fashion. In some embodiments, the execution module 312 may be configured in the device manager of the distributed controller 202.

Returning to FIG. 3, the other data 309 may store data, including temporary data and temporary files, generated by the one or more modules 305 for performing the various functions of the distributed controller 202. The one or more modules 305 may also include the other modules 305 to perform various miscellaneous functionalities of the distributed controller 202. The other data 304 may be stored in the memory 305. It will be appreciated that the one or more modules 305 may be represented as a single module or a combination of different modules.

Figure 5:
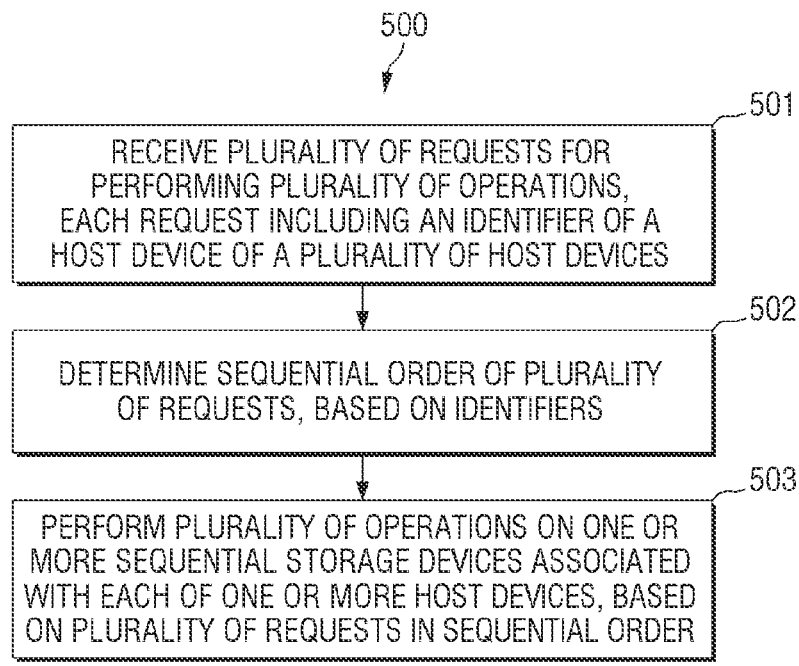
FIG. 5 shows an exemplary flow chart illustrating method steps for managing the sequential storage devices in the distributed storage environment, in accordance with some embodiments.

FIG. 5 shows an exemplary flow chart illustrating method steps for managing the one or more sequential storage devices 204 in the distributed storage environment, in accordance with some embodiments. As illustrated in FIG. 5, the method 500 may comprise one or more steps. The method 500 may be described in the context of computer executable instructions. Generally, computer executable instructions may include routines, programs, objects, components, data structures, procedures, modules, and functions, which perform particular functions or implement particular abstract data types.

The order in which the method 500 is described is not intended to be construed as a limitation, and in some embodiments, any number of the described method blocks may be combined in any order to implement the method. In some embodiments, individual blocks may be omitted from the methods without departing from the scope of the subject matter described herein. Furthermore, the method may be implemented in hardware, software, firmware, or combination thereof.

At step 501, the distributed controller 202 receives the plurality of requests for performing a plurality of operations. In some embodiments, the plurality of operations may include write operations. Each request of the plurality of requests comprises data of a client device from the one or more client devices 201 and an identifier of a host device from one or more host devices 203. The plurality of requests is communicated between the one or more client devices 201 and the one or more host devices 203 via the dedicated IO path 402. The plurality of requests is stored in the cache associated with the distributed controller 202.

At step 502, the distributed controller 202 determines the sequential order of the plurality of requests, based on the identifiers. For example, the distributed controller 202 may determine the sequential order of the plurality of requests, based on the identifier of each of the one or more host devices 203. The data is written sequentially in the one or more sequential storage devices 204. Hence, the distributed controller 202 determines the sequential order of the plurality of requests received in a random order from the one or more client devices 201.

At step 503, the distributed controller 202 performs the plurality of operations on the one or more sequential storage devices 204 associated with each of the one or more host devices 203, based on the plurality of requests in the sequential order. The plurality of operations may include the write operations for writing the data of the one or more client devices 201 to the one or more sequential storage devices 204. In some embodiments, the distributed controller 202 may perform the plurality of operations, upon determining the sequential order. In some embodiments, the distributed controller 202 may perform the plurality of operations, upon receiving the command to write the data of the one or more client devices 201 to the one or more sequential storage devices 204.

Computer System

Figure 6:
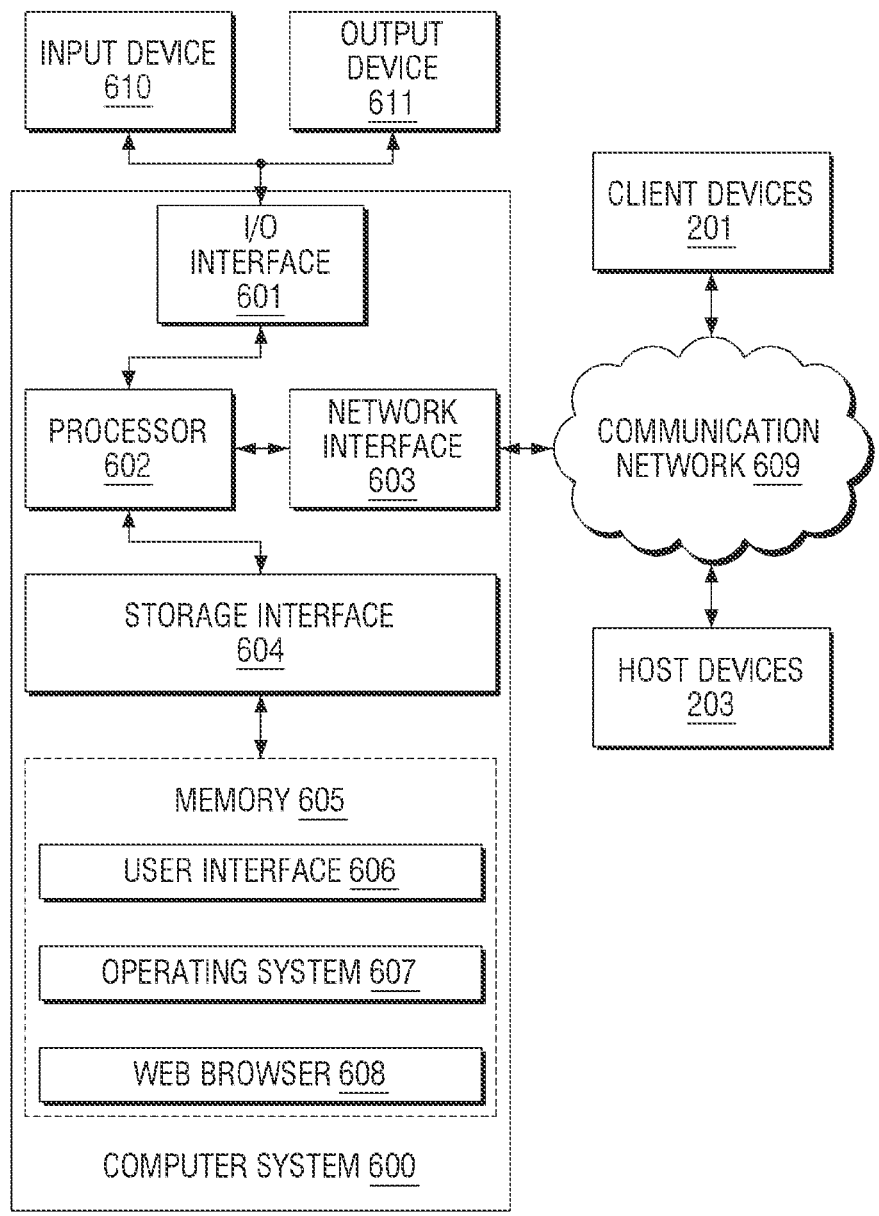
FIG. 6 shows a block diagram of a computing system for managing the sequential storage devices in the distributed storage environment, in accordance with some embodiments.

FIG. 6 shows a block diagram of a computing system for managing the sequential storage devices in the distributed storage environment, in accordance with some embodiments. In an embodiment, the computer system 600 may be the distributed controller 202. Thus, the computer system 600 may be used to manage the one or more sequential storage devices 204 in the distributed storage environment. The computer system 600 may communicate with the one or more client devices 201 and the one or more host devices 203 over a communication network 609. The computer system 600 may comprise a processor 602 (also referred to as a Central Processing Unit (CPU) 602. The processor 602 may comprise at least one data processor. The processor 602 may include specialized processing circuitry such as integrated system (bus) controllers, memory management control circuitry, floating point circuitry, graphics processors, digital signal processors, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 may communicate with the one or more client devices 201 and the one or more host devices 203 through the communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and the like. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program code or database components, including, without limitation, a user interface 606, an operating system 607, a web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLE® ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICRO SOFT® exchange, Post Office Protocol (POP), Simple Mail Transfer Protocol (SMTP), or the like. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure provides a method, a distributed controller, and a system for managing the sequential storage devices in a distributed storage environment. The TO management of the sequential storage devices is performed by the distributed controller communicating between the client devices and the host devices. The distributed controller converts random TO requests from the client devices in a sequential order for storing the data of the client devices in the sequential storage devices. This configuration and operation helps to maximize performance. Further, operations on the sequential storage devices are faster since the operations are performed in parallel across the host devices. A dedicated TO path may be provided between the host devices and the client devices via the distributed controller. Hence, a traditional TO path between the client devices and the host devices (i.e., a direct TO path between the client devices and the host devices) will not be impacted and data transfer on both the traditional TO path and the dedicated TO path is faster. This configuration and operation avoids idle times, thus increasing system throughput and optimizing network bandwidth utilization. The data may be cached in the distributed controller instead of writing to the sequential storage devices. The data may be then written to the sequential storage devices, based on a requirement. The system may comprise multiple controller instances of the distributed controller, thus ensuring fault tolerance of the system.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 shows certain events occurring in a certain order. In some embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that issue on an application based here on. Accordingly, the disclosure of the embodiments is intended to be illustrative, but not limiting, of the scope set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:
   receiving, by a plurality of controller instances included in a distributed controller, a plurality of requests for performing a plurality of operations, from one or more client devices in a distributed storage environment, each request being a random IO request and comprising data of a client device from the one or more client devices and an identifier of a host device from one or more host devices, each of the one or more host devices being associated with one or more sequential storage devices;
   coordinating, by the plurality of controller instances included in the distributed controller, the plurality of requests by caching the plurality of requests in the plurality of controller instances and determining, for each of the one or more host devices by the plurality of controller instances of the distributed controller, a sequential order of requests for the host device, based on the identifiers included in the plurality of requests; and performing, by the distributed controller in the sequential order, the plurality of operations on the one or more sequential storage devices, wherein the coordinating of the plurality of requests is performed via a dedicated IO path through the distributed controller separately from a traditional IO path for data communications that is provided directly between the one or more client devices and the one or more host devices.

2. The method as claimed in claim 1, wherein the plurality of operations include write operations and/or cache read operations.

3. The method as claimed in claim 1, wherein the one or more sequential storage devices are storage devices in which the data of the one or more client devices is only able to be written sequentially.

4. A distributed controller comprising:
a plurality of controller instances, each including:
a memory;
a communication interface for communicating between one or more host devices and one or more client devices of a distributed storage environment; and
one or more processors coupled to the memory, wherein the memory stores processor-executable instructions, which, on execution, cause the one or more processors to implement that controller instance,
wherein the plurality of controller instances are configured to at least:
receive a plurality of requests for performing a plurality of operations, from the one or more client devices, each request being a random IO request and comprising data of a client device from the one or more client devices and an identifier of a host device from the one or more host devices, each of the one or more host devices comprising and being associated with one or more sequential storage devices;
coordinate the plurality of requests by caching the plurality of requests in the memories of the plurality of controller instances and determine, for each of the one or more hosts, a sequential order of requests for the host device, based on the identifiers included in the plurality of requests; and
perform, in the sequential order, the plurality of operations on the one or more sequential storage devices associated with each of the one or more host devices, and
wherein the plurality of requests are coordinated via a dedicated IO path that passes through the distributed controller and that is separate from a traditional IO path for data communications that is provided directly between the one or more client devices and the one or more host devices.

5. The distributed controller as claimed in claim 4, wherein the data is transmitted via the traditional IO path in parallel with the data transmitted via the dedicated IO path.

6. The distributed controller as claimed in claim 4, wherein the plurality of operations include write operations and/or cache read operations.

7. The distributed controller as claimed in claim 4, wherein the one or more sequential storage devices are storage devices in which the data of the one or more client devices is only able to be written sequentially.

8. A system comprising, in a distributed storage environment:
one or more client devices;
one or more host devices, each host device comprising and being associated with one or more sequential storage devices; and
a distributed controller including a plurality of controller instances,
wherein the plurality of controller instances are configured to at least:
receive a plurality of requests for performing a plurality of operations, from the one or more client devices, each request being a random IO request and comprising data of a client device from the one or more client devices and an identifier of a host device from the one or more host devices;
coordinate the plurality of requests by caching the plurality of requests in the memories of the plurality of controller instances and determine, for each of the one or more host devices, a sequential order of requests for the host device, based on the identifiers included in the plurality of requests; and
perform, in the sequential order, the plurality of operations on the one or more sequential storage devices associated with each of the one or more host devices,
wherein the system further comprises a dedicated IO path between the one or more client devices and the distributed controller and between the distributed controller and the one or more host devices, and a traditional IO path for data communications that is provided directly between the one or more client devices and the one or more host devices, and that is separate from the dedicated IO path that passes through the distributed controller, and
wherein the plurality of requests are coordinated via the dedicated IO path.

9. The system as claimed in claim 8, wherein each of the plurality of controller instances of the distributed controller comprises a cache for storing the plurality of requests.

10. The system as claimed in claim 8, wherein the data is transmitted via the traditional IO path in parallel with the data transmitted via the dedicated IO path.

11. The system as claimed in claim 8, wherein the plurality of operations include write operations and/or cache read operations.

12. The system as claimed in claim 8, wherein the one or more sequential storage devices are storage devices in which the data of the one or more client devices is only able to be written sequentially.

13. The system as claimed in claim 8, wherein each of the one or more controller instances is configured to perform, in the sequential order, the plurality of operations.

14. The method as claimed in claim 1, wherein the dedicated IO path is dedicated to IO management of the one or more sequential storage devices, and
wherein the IO management includes one or more of device offset handling, buffer handling, or block allocation.

15. The distributed controller as claimed in claim 4, wherein the dedicated IO path is dedicated to IO management of the one or more sequential storage devices, and
wherein the IO management includes one or more of device offset handling, buffer handling, or block allocation.

16. The system as claimed in claim 8, wherein the dedicated IO path is dedicated to IO management of the one or more sequential storage devices, and wherein the IO management includes one or more of device offset handling, buffer handling, or block allocation.

\* \* \* \* \*